Jan. 6, 1970 KIMIO KAKIZAKI 3,487,538

METHOD OF AND APPARATUS FOR PRODUCING SUPERCONDUCTIVE STRIPS

Filed July 3, 1967 2 Sheets-Sheet 1

INVENTOR

KIMIO KAKIZAKI

BY Paul M. Craig Jr.
ATTORNEY

INVENTOR

KIMIO KAKIZAKI

BY Paul M. Craig Jr.
ATTORNEY

United States Patent Office 3,487,538

Patented Jan. 6, 1970

3,487,538

METHOD OF AND APPARATUS FOR PRODUCING SUPERCONDUCTIVE STRIPS

Kimio Kakizaki, Hitachi-shi, Japan, assignor to Hitachi Cable, Ltd., Tokyo, Japan, a corporation of Japan Filed July 3, 1967, Ser. No. 650,906
Claims priority, application Japan, July 8, 1966, 41/44,127, 41/44,128
Int. Cl. H01s *4/00;* B21b *3/00*
U.S. Cl. 29—599 4 Claims

ABSTRACT OF THE DISCLOSURE

A novel method of and a novel apparatus for producing composite conductors or the so-called superconductive strips composed of a strip of a normal conductive material and wires of a superconductive material fitted in respective longitudinal grooves formed in the upper surface of said strip, in which a rolling force is applied transversely to the grooved surface of said strip with the wires received in said respective grooves, whereby the opening of each groove above the wire is tightly closed with part of said strip, and which therefore enable the composite conductors to be produced at high efficiency without subjecting the wires of superconductive material to substantial tension, said composite conductors having a good bond between the superconductive material and the normal conductive material and being highly resistive to bending.

BACKGROUND OF THE INVENTION

Field of the invention

The present invention relates to a method of and an apparatus for producing composite conductors or the so-called superconductive strips which are used as wire rods in superconductive magnets or transformers, and more particularly to a method of and an apparatus for shaping composite conductors by placing in each longitudinal groove formed in a metal strip a wire of a metal different from that of which said strip is made and tightly closing the opening of each groove above the wire with part of said metal strip.

DESCRIPTION OF THE PRIOR ART

Composite conductors which are used as wire rods in superconductive magnets or transformers are provided in the form of the so-called strip or cable in which the peripheral surface of a wire made of a superconductive material is shielded with a large amount of a normal conductive material.

In the production of the composite conductors of the structure described above, it has been necessary heretofore to perform the fabrication while suppressing elongation of the wire of superconductive material, because the wire would tend to break during the fabrication due to the marked difference in elongation between the two constituent materials, i.e. the elongation of the superconductive wire is much smaller than that of the normal conductive material shielding said wire.

For this reason, a method has been employed which comprises forming longitudinal grooves in the upper surface of a strip of a normal conductive material, fitting in each of said grooves a wire of a superconductive material whose IC value has previously been elevated by a series of heat treatments and choking the edges of said groove so as to secure said wire in said groove. Such method, however, has the drawback that, since the wire is secured merely by the choked edges of the groove, the wire tends to come out of the groove upon bending of the metal strip where said wire is located on that side of the metal strip which is subjected to tension, or the wire tends to slide in the groove in either case where said wire is located on the tension side or the compression side of the metal strip, and as a result the contact between said wire and said metal strip becomes insufficient, making it impossible to obtain a desired composite conductor. In these circumstances, an improved method has been desired.

SUMMARY OF THE INVENTION

It is, therefore, an object of this invention to provide composite conductors which are free from the aforementioned drawback.

It is another object of this invention to provide a novel method of producing composite conductors of the type described.

It is still another object of this invention to provide a method of embedding a wire in a metal strip without subjecting said wire to substantial tension or elongation.

It is still another object of this invention to provide an apparatus for the shaping of composite conductors, in which an intermittent transverse pressure is applied to the edges of each of the elongate grooves, formed in a metal strip and each having a wire mounted therein, to thereby tightly close the opening of said groove above said wire with part of the metal strip.

It is still another object of this invention to provide an apparatus for the shaping of composite conductors, which is capable of shaping the composite conductors with high efficiency without subjecting either constituent material to tension.

It will, therefore, be understood that still another object of this invention is to provide an apparatus for the shaping of such composite conductors in which the metal wires embedded therein will not be broken even when the elongation characteristic of said wires is small.

According to the present invention, composite conductors are produced by placing wires of a superconductive material in respective longitudinal grooves formed in the upper surface of a strip made of a normal conductive material and exerting a rolling force on said surface of the metal strip transversely thereof, thereby filling the top opening of each groove above the wire with part of the metal strip.

The wire composing a composite conductor serves as a medium which is capable of carrying an extremely large current density therethrough in a transversely extending ferromagnetic field. In view of this, the wire is made of the so-called superconductive materials, including such alloys as Nb—Zr, Nb—Ti and Nb—Zr—Ti type alloys and such compounds as $Nb_3Al$, $Nb_3Sn$ and $V_3Ge$, which exhibit an extremely large electric conductivity at low temperatures.

For practical applications, these superconductive materials are used as they are, in the form of a wire rod (which may be coated, for example, with aluminum, cadmium, copper, gold, silver or platinum, as required), or are embedded in a metal wire or used to cover the surface of another wire rod.

On the other hand, the metal strip which serves as an electric and thermal conductor is made of normal electric conductive materials, e.g. copper, gold, silver, platinum, cadmium, aluminum, indium, tin and lead, and alloys consisting primarily of said metals. These normal electric conductive materials are provided, for practical use, in the form of a strip or tape, with a desired number of longitudinal grooves formed in the upper surface thereof, each of said grooves having a width substantially equal to and a depth greater than the diameter of the aforementioned superconductive wire to be embedded therein.

According to the present invention, the constituent materials described above are brought into contact and then a rolling pressure is applied transversely to the grooved surface of the metal strip. In this case, it is to be noted that the rolling pressure may not necessarily be applied to said surface in a direction exactly at right angles to the travelling direction of the metal strip but it may be applied at a slight angle to said travelling direction to attain the desired object. It is also to be noted that the desired object may be attained by applying the rolling pressure either continuously or intermittently. Upon completion of rolling, the openings of the grooves above the wires are tightly closed with part of the metal strip. In practicing the method described, fine wires of a metal of the same quality as the metal strip, may be placed on each of the wires having been mounted in the respective grooves as required before the rolling operation, so as to cover said wires to some extent.

The apparatus according to the present invention comprises a frame, a roll rotatably mounted in said frame and having an annular groove formed in the peripheral edge thereof, said groove having a cross sectional configuration coinciding with that of a composite conductor to be produced, a plurality of pressure rollers arranged such that the axis of each roller is in a crossing relation to the axis of said roll and the outer peripheral surface thereof may be brought into contact with the outer peripheral surface of said roll as said pressure rollers are bodily rotated about said roll, and an outer casing supporting said rollers therein and rotatably mounted on said frame.

DESCRIPTION OF THE PREFERRED EMBODIMENTS

In order that the present invention may be more clearly understood, the present invention will be described in detail hereunder with reference to the accompanying drawings illustrating the embodiments thereof.

Figures 1, 2, 3, 4, 5:
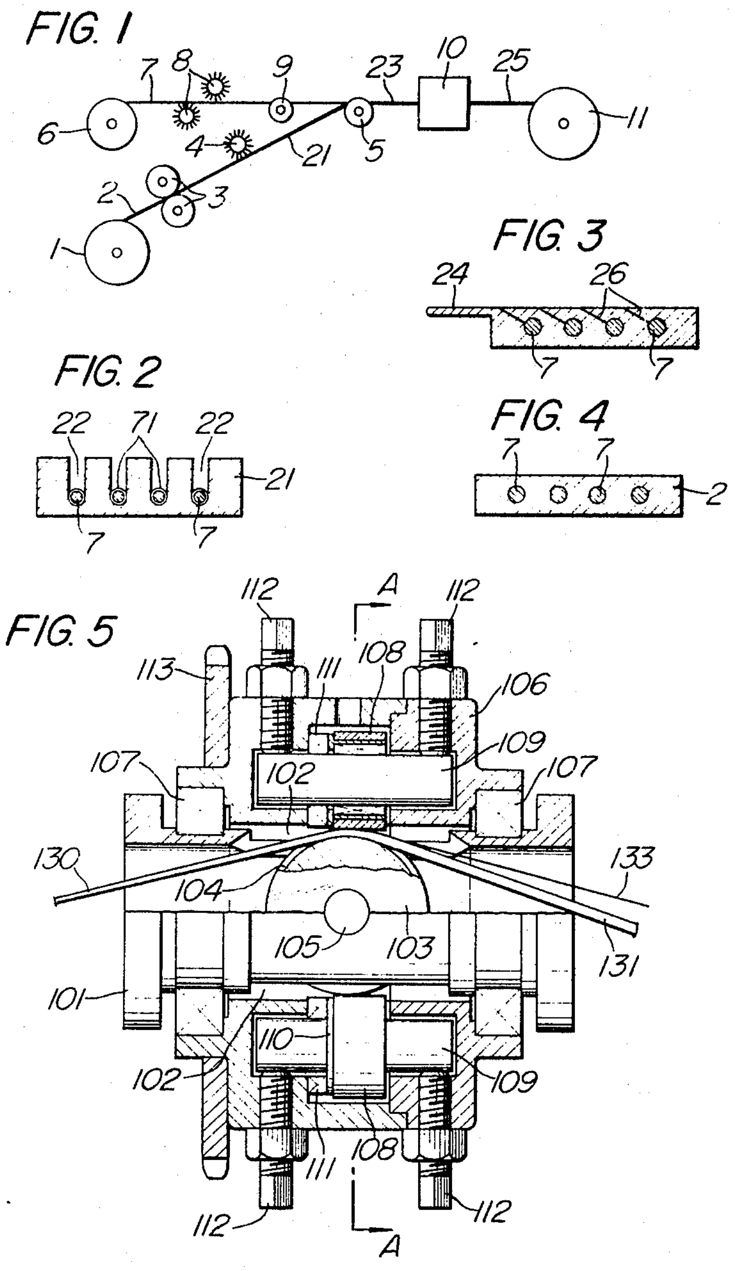
FIGURE 1 is a diagram illustrating briefly the process of the present invention.
FIGURES 2 and 3 are views showing the transverse cross sections of a composite conductor at respective stages of the production.
FIGURE 4 is a transverse cross section of the complete composite conductor.
FIGURE 5 is a side elevation, partly in section, of an embodiment of the apparatus according to the present invention.

Referring to FIG. 1 which illustrates diagrammtically the process of the present invention, a reel 1 has wound thereon a metal strip 2 which is made of copper and has a thickness of 1.3 mm. and a width of 4.0 mm. The metal strip 2 paid out from the reel 1 is passed through the nip of groove-forming rolls 3, whereby four equally spaced grooves, each having a width of about 0.25 mm. and a depth of about 0.8 mm., are formed in the upper surface of said metal strip. Then, after having the grooved surface thoroughly cleaned and polished by means of a brush 4, the grooved metal strip 21 is delivered onto a roll 5.

Four reels 6 are arranged side-by-side, each with a Nb—Ti alloy wire 7 wound thereon, said wire being 0.25 mm. in diameter and coated with a 25$\mu$ thick copper plating. The four wires 7 payed out from these four reels 6 have their surfaces thoroughly cleaned and polished by wire brushes 8 and are passed onto the grooved metal strip 21 trailing on the roll 5, via a guide roll 9, so as to be received in the respective grooves in said metal strip.

Referring next to FIG. 2, there is shown, in enlargement, the cross section of the grooved metal strip 21 with the wires 7 received in each of the grooves. Numeral 22 designates the grooves and 71 designates the layer of copper plating. The metal strip 23 having received the wires 7 in the respective grooves 22 is led into a rolling apparatus 10 to be described later, wherein a composite conductor 25 is shaped with the wires 7 embedded in said metal strip 23.

The cross section of the composite conductor 25 obtained by the method described above is shown in FIG. 3. A lug 24 resulting from the rolling operation is cut away either before or after the composite conductor 25 is taken up on a take-up reel 11. Numeral 26 designates a plane of bond between the opposite walls of each groove and between said walls and each wire 7.

As is clearly seen from the figure, these portions of the metal strip 21 surrounding each wire 7 are brought into intimate contact with the surface of said wire upon deformation of said metal strip, so that each wire 7 is rigidly held in said metal strip and will not come out of or slide in said metal strip even when the composite conductor is bent. It is thus possible to obtain a satisfactory composite conductor. In addition, according to the inventive method described, the wire 7 are not subjected to tension (or elongation) during the shaping operation, because the metal strip is rolled transversely, and accordingly possible breakage of the wires can be avoided.

The bond between the wires 7 and the metal strip 21 may be further improved by homogenizing annealing the composite conductor 25 in a heating furnace either before or after the composite conductor is taken up on the take-up reel. Where the wires 7 have not previously been subjected to heat treatment for desired properties, such heat treatment may be accomplished simultaneously with the homogenizing annealing.

Although, in the embodiment described, four wires are embedded in the metal strip, it will be readily appreciated that composite conductors having more wires embedded therein may be obtained by reducing the space interval between the adjacent wires or by the use of a metal strip having a greater width. In the latter case, the resultant wide composite conductor may be slit by means of a slitter or the like, whereby a plurality of composite conductors, each having a few wires embedded therein, can be produced all at once.

It is also to be understood that, while in the embodiment described, the metal strip with the wires therein is rolled in one direction, it may be rolled in both directions alternatively by a series of rolling apparatus. Such alternate rolling in both directions is highly effective for the shaping of composite conductors of the type wherein the wires are embedded in two layers.

As may be clear from the foregoing description, the composite conductors produced according to the method of the present invention have a good bond between the superconductive material and the normal conductive material, so that they are highly resistive not only to the cold but also to bending and therefore highly effectively used for practical applications as a superconductive coil, etc. Further, according to the method of this invention, composite conductors of practical value can be obtained easily at high efficiency, since the constituent wires are subjected to substantially no tension (or elongation) during the shaping operation.

Figure 6:
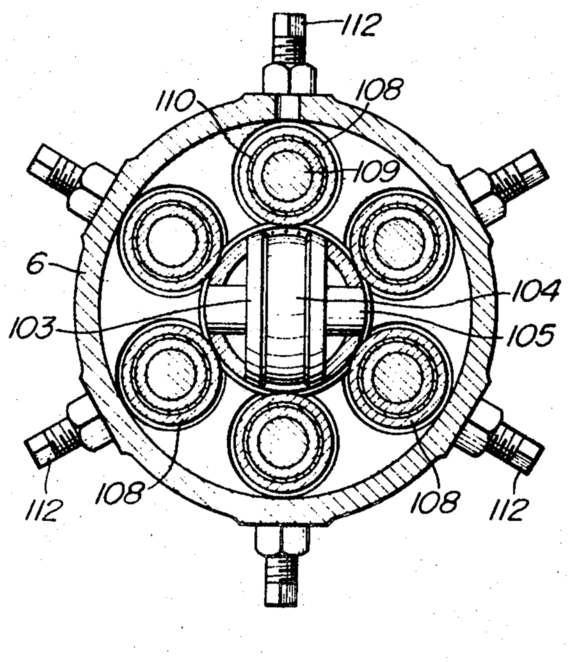
FIGURE 6 is a cross section of the apparatus taken along the line A—A of FIGURE 5.

Now, the apparatus of the present invention will be described with reference to FIGS. 5, 6 and 7. Referring first to FIGS. 5 and 6, a cylindrical frame 101 has notches 102 formed in the central portion thereof and is fixedly mounted on a support bed not shown. A roll 103 having a peripheral groove 104 is rotatably mounted in the cylindrical frame 101 on a shaft 105. While the diameter of the roll 103, in the arrangement shown, is substantially the same as the outer diameter of the cylindrical frame 101, the size of the roll 103 is not restricted, all that is required being that the top portion of the roll is located at the notch 102 in the cylindrical frame 101.

Designated by numeral 106 is an outer casing which is rotatably mounted on the cylindrical frame 101 by way of bearings 107. Interior of the outer casing 106 are disposed six pressure rollers 108 arranged radially with respect to the axis of said outer casing, with their outer peripheral surfaces in contact with the outer peripheral surface of the cylindrical frame 101. Thus, it will be appreciated that the pressure rollers 108 are brought into contact with the outer peripheral surface of the roll 103 one after another as said pressure rollers are bodily rotated about said cylindical frame.

Numeral 110 designates bushes, 111 bearings, 112 adjustment screws for adjusting the centers of respective roller spindles 109, and 113 designates a power transmitting chain wheel which is secured to the outer casing 106 by means of wedges and through which said outer casing is driven by a transmission gear operatively connected to an electric motor or a prime mover. The chain wheel 113 may be substituted by a gear or a pulley.

Figure 7:
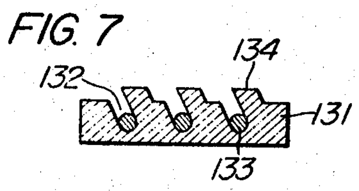
FIGURE 7 is a transverse cross section of an example of the material composite conductor before being shaped according to the present invention.

With the apparatus of the construction described above, when a metal strip 131 having grooves 132 formed in the upper surface thereof is placed in the peripheral groove in the roll 103 in the manner shown in FIG. 5, with metal wires 133 received in the respective grooves 132 as shown in FIG. 7, and the outer casing 106 is driven from the electric motor or prime mover through the transmission gear and the chain wheel 113, ribs 134 adjoining the respective grooves 132 of the metal strip 131 are bent over said grooves by the transverse force intermittently applied thereto by the pressure rollers 108, thus filling the openings of said grooves 132 above the respective wires 133. As a result, a composite conductor is formed which has a thickness corresponding to the depth of the peripheral groove 104 in the roll 103, that is to say that a composite conductor of a desired thickness is obtained. The pressure rollers 108 are bodily rotated about the cylindrical frame at the rate of speed of 700 to 1800 r.p.m., while the roll 103 is rotated at an r.p.m. equal to the rate of speed (5 to 15 m./min.) at which the composite conductor 130 formed is taken up. With the apparatus of this invention, the metal strip 131 may be reduced to a thickness of 0.75 mm. by the intermittent rolling or shearing force given by the pressure rollers.

In this case, a flat and smooth surface of the composite conductor may be obtained by suitably adjusting the take-up speed relative to the rate of rotation of the outer casing 106. Although in the embodiment described, the pressure rollers 108 are supported on the respective spindles 109 in parallel to the travelling direction of the composite conductor 130, they may be arranged at an angle to said travelling direction as required.

The use of the apparatus according to the present invention is advantageous in that the opening of each longitudinal groove in the metal strip above the wire can be closed with much ease and accuracy, in that a composite conductor may be produced with uniformity at high efficiency and further in that, since the constituent materials are not subjected to tension during the shaping process, there is no fear of said materials being broken and accordingly a composite conductor may be produced in an efficient manner even when the metal wires to be embedded therein have a very small elongation. Thus, the present invention is a great contribution to the composite conductor shaping operation.

What is claimed is:

1. A method of producing composite conductors, comprising placing wires of a superconductive material in respective longitudinal grooves formed in the upper surface of a strip of a normal conductive material and exerting a transverse rolling pressure on said surface of the strip to thereby fill the openings of said grooves above said respective wires with part of said strip.

2. An apparatus for the shaping of composite conductors, compirsing a frame, a roll rotatably mounted in said frame on a shaft and having a groove formed in the peripheral edge thereof, said groove having a cross sectional configuration coinciding with that of the composite conductor to be produced, a plurality of pressure rollers arranged such that the axis of each of said rollers is in crossing relation to the axis of said roll and the outer peripheral surface thereof may be brought into contact with the outer peripheral surface of said roll as it is bodily rotated about said frame, and an outer casing supporting said pressure rollers therein and rotatably mounted on said frame.

3. A method of producing composite conductors, comprising placing wires of a superconductive material in respective longitudinal grooves formed in the upper surface of a strip of a normal conductive material and exerting a substantially transverse rolling pressure on said surface of said strip to fill the openings of said grooves above said respective wires with part of said strip while substantially maintaining the original length of said wires and said strip.

4. A method of fabricating a superconductor-conductor composite, wherein the composite is substantially free from tensile stress and wherein the length of said composite is substantially equal to the original length of the individual components thereof, which comprises:

placing superconductor wires in respective longitudinal grooves formed in the upper surface of a strip of normal conductive material, said grooves being deeper than the diameter of said wires; and exerting a substantially transverse rolling pressure on said upper surface of said strip to move the portion of said strip above said wires in the direction of said transverse rolling pressure and thus fill the openings in said grooves.

References Cited

UNITED STATES PATENTS

| | | | |
|---|---|---|---|
| 3,109,963 | 11/1963 | Geballe | 29—529 |
| 3,167,857 | 2/1965 | Saito et al. | 29—492 X |
| 3,201,862 | 8/1965 | Gotoh | 29—473.9 X |
| 3,218,693 | 11/1965 | Allen et al. | 29—599 |
| 3,320,666 | 5/1967 | Dion | 29—470.1 X |
| 3,327,370 | 6/1967 | Cohen | 29—599 |

PAUL M. COHEN, Primary Examiner

U.S. Cl. X.R.

29—470.1, 473.9, 498.5, 492; 72—78, 191, 225